Patented Feb. 27, 1934

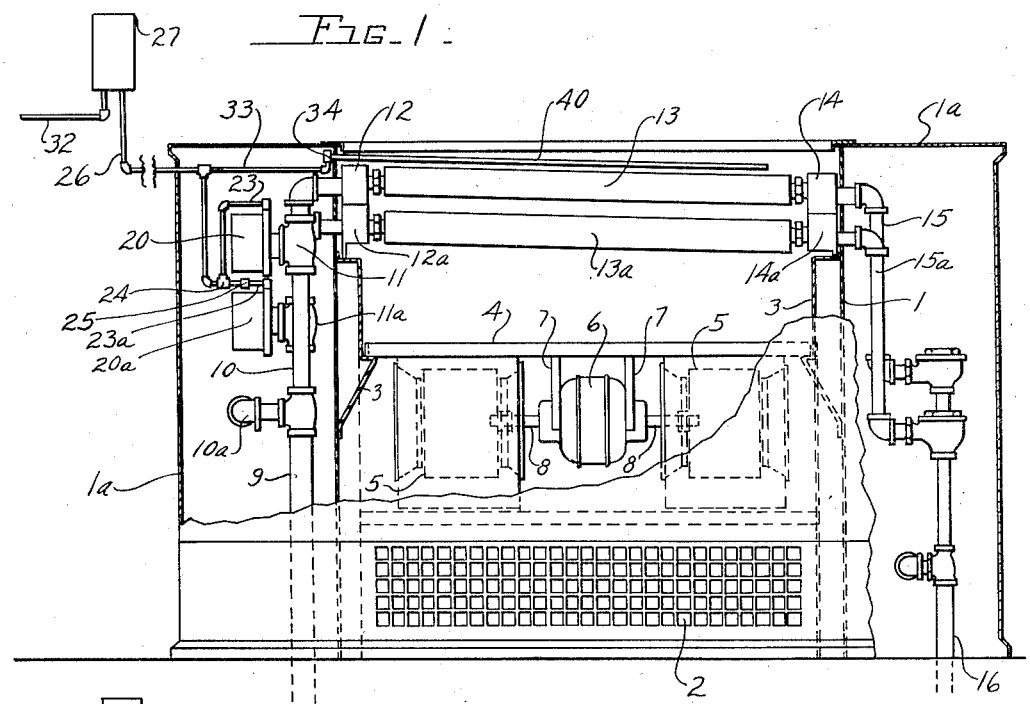
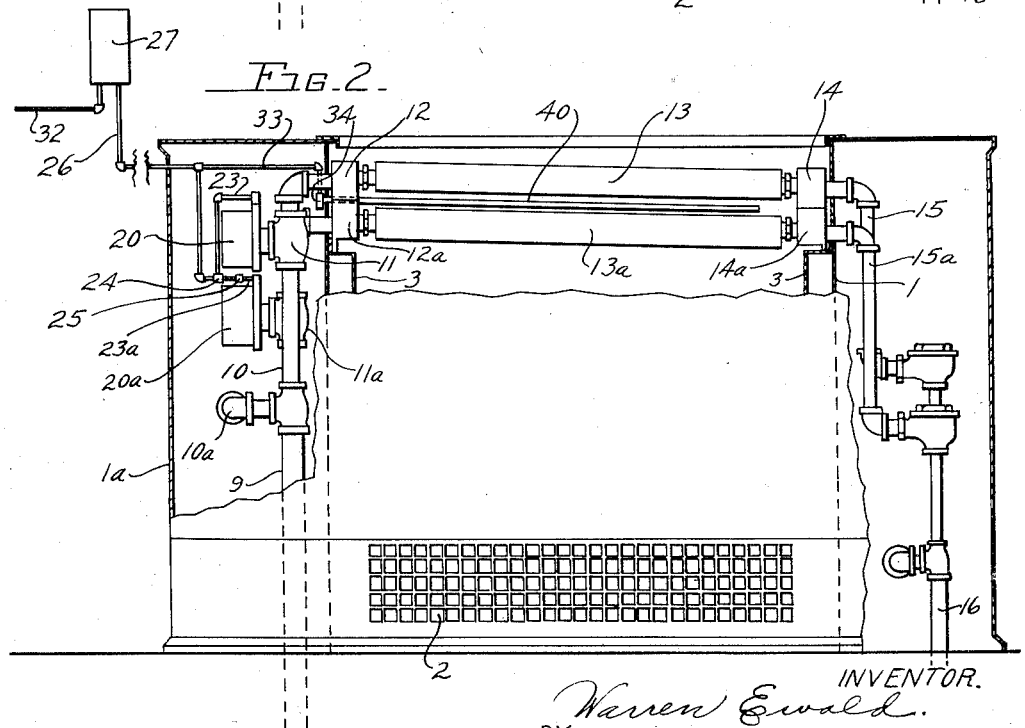

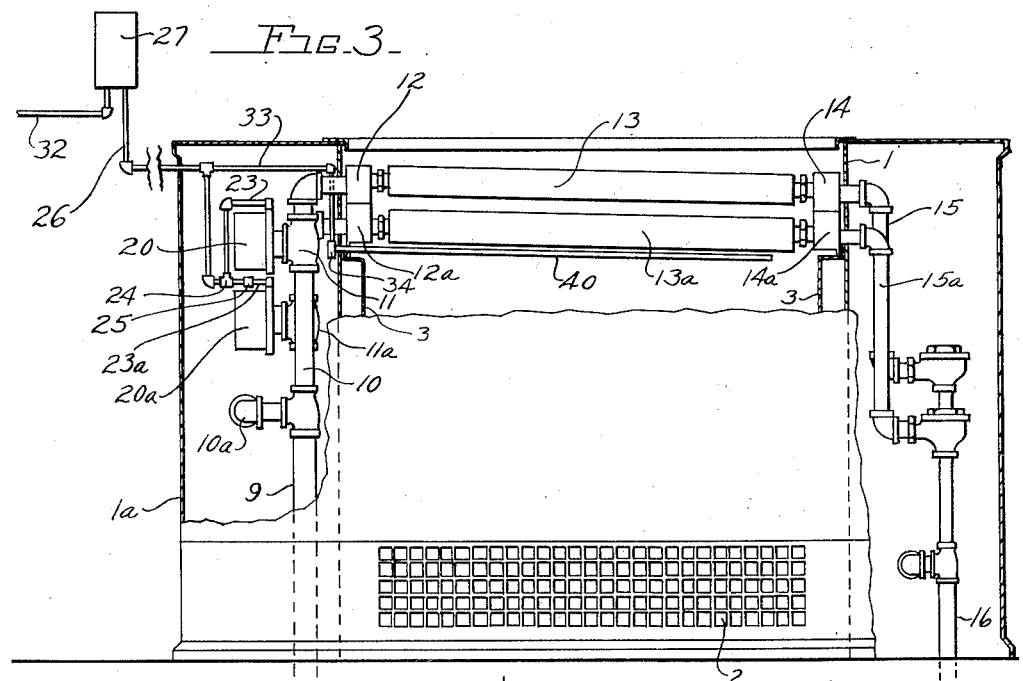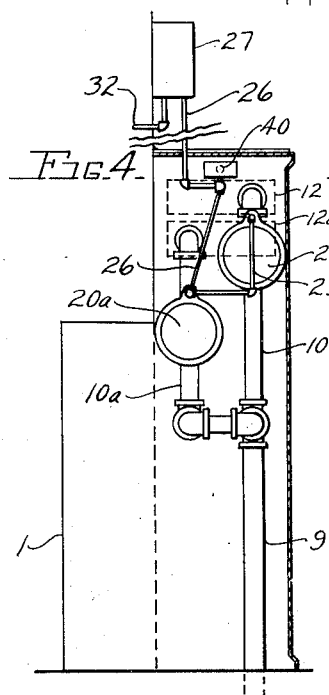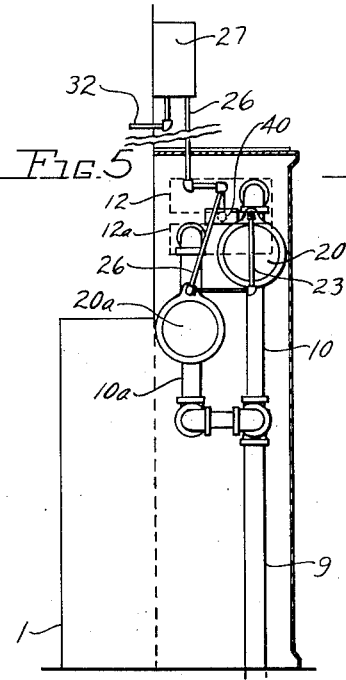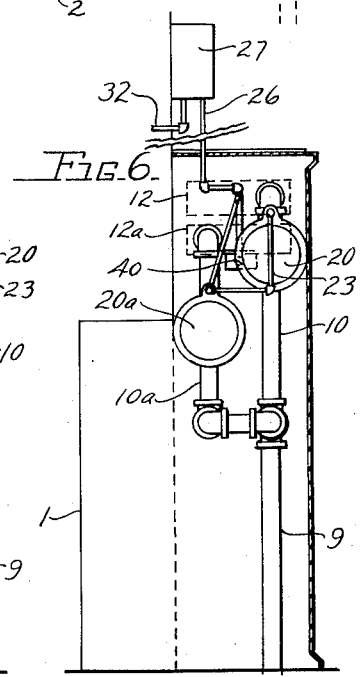

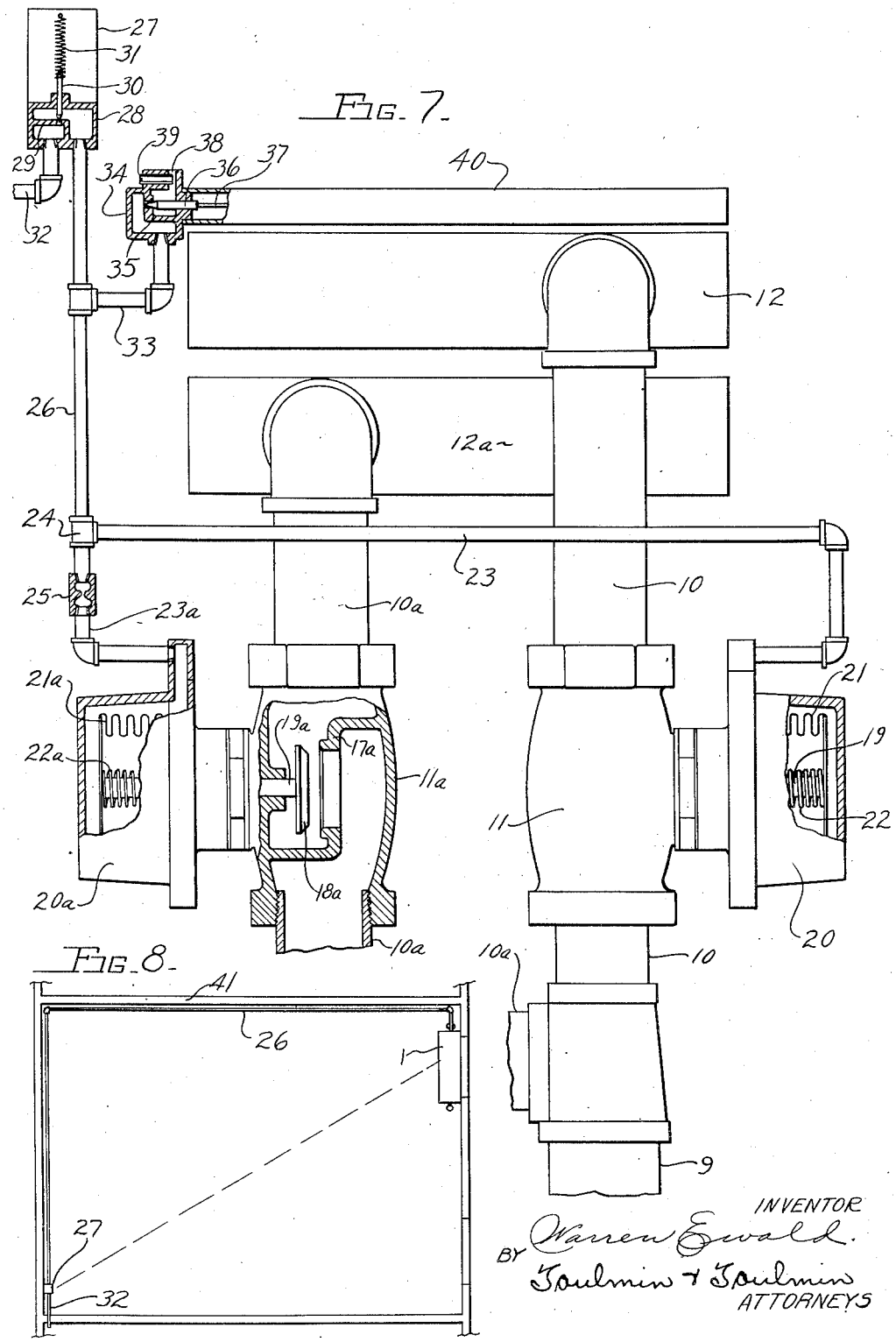

1,948,494

UNITED STATES PATENT OFFICE 1,948,494

UNIT HEATER AND VENTILATOR CONTROL SYSTEM

Warren Ewald, Columbus, Ohio, assignor, by mesne assignments, to Buckeye Blower Company, Columbus, Ohio, a corporation of Delaware Application February 2, 1932. Serial No. 590,445

9 Claims. (Cl. 236—37)

This invention relates to improvements in radiator control, and particularly to dual radiators with a tempering thermostat located either between the radiators, beneath the radiators or over the radiators, and another thermostat located in the room remote from the radiators.

It has to do with the system by which fifteen pounds of air pressure for closing the radiator valves is admitted when the temperature of the room on the inside wall of the room rises above 72 degrees F., or any other desired degree, and when the temperature of the room falls below this temperature, pressure is removed from the valve so that it opens to admit heating fluid to the radiators.

It is an object of this invention to provide, in connection with a thermostatic means for opening and closing valves for the delivery of a heating fluid to the radiators, means to cause a slight opening of one valve for tempering the air immediately adjacent the radiators due to the cold air passing over the radiators and before the temperature of the thermostat controlling the opening or closing of the valves can operate. This tempering means operates to reduce the pressure on a valve which controls the tempering radiator so that a slight amount of heating fluid is admitted to this radiator while the closing means is acting for closing the valves.

These and other objects and advantages will appear from the following description taken in connection with the drawings.

Referring to the drawings:

Figure 1 is a front elevation of a heating unit with the casing partly in section to show the inside mechanisms, and showing the tempering thermostatic unit located above the radiators.

Figure 2 is a view similar to Figure 1 but showing the tempering thermostatic unit located between the radiators.

Figure 3 is a view similar to Figures 1 and 2 but showing the tempering thermostatic unit located beneath all of the radiators.

Figure 4 is an end view of the heating unit as shown in Figure 1.

Figure 5 is an end view of the heating unit as shown in Figure 2.

Figure 6 is an end view of the heating unit as shown in Figure 3.

Figure 7 is an enlarged end view of the radiators showing the various pipes connected thereto.

Figure 8 is a diagrammatic view of a room with the heating unit located therein.

The casing forming the housing or inclosure for the heating and ventilating structure is indicated by the numeral 1, and has an inlet 2. Within the casing and supported at each end thereof is a bracket 3 adapted to support a frame 4, supporting beneath it two fans 5, which are operated by a motor 6 supported by means of a frame 7 beneath the frame 4. This motor has a shaft 8 forming part of the fan operating shaft.

There is provided on each end of the main casing a subcasing 1a for housing the parts associated with the main casing so there is presented nothing more than a square ornamental casing or box at one side of the room. Practically no pipes are visible.

The inlet pipe is indicated by the numeral 9, and branches into two branches, 10 and 10a. The branch 10 leads to the upper or tempering radiator head 12, while the other leads to the lower or heating radiator head 12a. In each of these pipes is a valve connection designated 11 in connection with the branch 10 and 11a in connection with the branch 10a.

The radiator associated with the radiator head 12 is indicated by the numeral 13, while that associated with the radiator head 12a is indicated by the numeral 13a. Each of these radiators has an outlet head, one designated 14 for the radiator 13 and the other designated 14a for the radiator 13a. Each has an outlet pipe, designated in one instance by the numeral 15 and in the other instance by the numeral 15a. These pipes unite into a common outlet 16.

In the valve connection 11a there is a partition 17a having an opening therein adapted to be closed by means of a valve 18a. The partition and valve are not shown in connection with the connection 11 but are similar in form and arrangement and purpose to those shown in connection with the valve connection 11a. However, the stem of the valve is shown in connection with the valve connection 11, and is indicated by the numeral 19, while a similar valve stem in connection with the part 11a is indicated by the numeral 19a.

Inclosing the outer end of the valve stem 19 is a casing 20. A similar casing 20a is used in connection with the valve stem 19a. Fitting over the end of the valve stem 19 is a metallic bellows 21, while a similar metallic bellows 21a is used in connection with the valve stem 19a. Around the valve stem 19 is a spring 22, while around the valve stem 19a is a similar spring 22a. These parts are all similar and operate in a similar manner, with the exception that the spring 22 is a four-pound pressure spring while the spring 22a is an eleven-pound pressure spring.

Connected to the casing 20 is a pipe 23, while connected to the casing 20a is a pipe 23a. These pipes unite in a T-coupling 24. Between the T-coupling 24 and the connection of the pipe 23a and the casing 20a is a restricted connection 25, which has therein a restricted opening so there is a gradual flow of air from the casing 20a when the air pressure is released, and a more rapid flow from the casing 20.

Extending from the T-coupling 24 is a pipe 26, which has on one end a thermostatic unit 27. On this thermostatic unit is a casing 28, into which the upper end of the pipe 26 is suitably inserted. This casing is divided into two chambers by means of a partition 29, with a communicating hole or passageway in the partition. This hole or passageway may be closed by means of a needle valve 30, operated by a thermostatic element 31 supported by the thermostatic unit 27.

Extending from one of the chambers is a pipe 32 connected to some source of air or gas pressure. The air or gas is maintained under a pressure of about fifteen pounds and the admission of this air under pressure to the casings 20 and 20a is controlled by the valve 30. When this valve is open, air under pressure is admitted to both of these chambers so that the valve stems 19 and 19a are acted upon to close the valves attached thereto. These valves are normally open; that is, they are open when no pressure is in the casings. It requires something over eleven pounds to close the valve 18a, and requires something over four pounds of pressure to operate upon the valve stem 19 to close the valve in the valve connection 11.

Extending from the pipe 26, between the thermostatic unit 27 and the T-coupling 24, is a branch pipe 33 extending into one chamber of a casing 34. This casing is divided into two chambers by means of a partition 35, having a hole therein adapted to be closed by means of a valve 36, which is operated by means of a thermostatic element 37. The other chamber of the casing has an outlet 38, regulated and controlled by means of a screw member 39. The thermostatic element 37 extends into a tubular member 40, which is closed at one end, and has its other or open end fitting over an extension on one side of the casing 34.

In Figure 8 there is shown a room. In one side of this room is located the heating unit, while on the opposite side, diagonally across the room and considerably above the floor, is located the thermostatic unit 27. When the temperature of the room reaches above a certain definite temperature, say 72 degrees, the thermostatic element 31 is acted upon to open the valve 30, thereby admitting pressure into both of the casings 20 and 20a, thereby closing the valves in the connection 11 and the connection 11a. These valves being closed the heating fluid is not admitted into the radiators.

The valve 30 remains open until the temperature of the room again falls to or below 72 degrees F. In the meantime the cold air passing into the room chills the air immediately adjacent the radiators so that this part of the room would become unduly chill if means were not provided for tempering the air. The means for tempering the air is the thermostatic unit located adjacent the radiators.

When the temperature of the air adjacent the radiators falls below a definite temperature, say 70 degrees, the valve 36 is open, thereby releasing the pressure from the casings 20 and 20a, but because of the restricted connection 25 air very slowly passes from the casing 20a but more rapidly passes from the casing 20, thereby reducing the pressure in this casing 20a so that the valve in the connection 11 may be opened by the action of the spring 22. This opening of the valve is slight but admits enough of the heating fluid to the radiator 13 to temper the air passing over the radiators. The valve 18a is still closed, and remains closed until the valve 30 is open, due to the fall of the temperature below 72 degrees, or any other regulated temperature.

When the valve 30 is closed the compressed gas is cut off from the casings, thereby releasing the pressure so that both heating fluid valves are open so that the heating fluid passes to both of the radiators, and continues to so pass until the temperature of the room reaches a point where the needle valve is again open, thereby closing both of the heating fluid valves so that no more heat is produced until a certain drop in the temperature takes place.

It will be understood that I desire to comprehend within my invention such modifications as come within the scope of my claims and my invention.

Having thus fully described my invention, what I claim as new and desire to secure by Letters Patent, is:

1. In a heating apparatus for a room, a plurality of radiators having a connection with a source of heating fluid, means connected to each radiator and operated by the temperature of the room remote from the radiators to successively cut off the heating fluid from the radiators, and means operated by the temperature adjacent one radiator and in opposition to the first-named means to admit a small amount of the heating fluid to said radiator to prevent the temperature around the radiators becoming too low.

2. In a heating apparatus for a room, a plurality of radiators having a connection with a source of heating fluid, means connected to each radiator and operated by the temperature of the room remote from the radiators to successively cut off the heating fluid from the radiators, and means operated by the temperature adjacent the radiator first cut off and in opposition to the first-named means to admit a small amount of the heating fluid to said radiator to prevent the temperature adjacent the radiator becoming too low.

3. In a heating apparatus, a plurality of radiators, a pipe connected at one end to a source of heating fluid and having at its other end a branch for each radiator, a valve for each branch adapted to close the branch, means for each valve tending to hold it open, a second pipe connected at one end to a source of air under pressure and having at its other end a branch for each valve to apply closing pressure thereto, and a valve to regulate the flow of air through the second pipe, one of said last-named branches having a restricted section to retard the flow of air through it.

4. In a heating apparatus, a plurality of radiators, a pipe connected at one end to a source of heating fluid and having at its other end a branch for each radiator, a valve for each branch adapted to close the branch, means tending to hold each valve open, a second pipe connected at one end to a source of air under pressure and having at its other end a branch for each valve to apply closing pressure thereto, a second valve to regulate the flow of air through the second pipe, one of said last-named branches having a restricted section to retard the flow of air through it, and a valve connected to the second pipe to relieve the pressure independent of the second valve.

5. In a heating apparatus, a plurality of radiators, a pipe connected at one end to a source of heating fluid and having at its other end a branch for each radiator, a valve for each branch adapted to close it, means tending to hold each valve open, a second pipe connected at one end to a source of air under pressure and having at its other end a branch for each valve to apply pressure thereto to close it, a second valve to open and close the second pipe, thermostatic means remote from the radiators to operate the last-named valve, one of said last-named branches having a restricted section to retard the flow of air through it, and a valve connected to the second pipe to relieve the pressure independent of the second valve.

6. In a heating apparatus, a plurality of radiators, a pipe connected at one end to a source of heating fluid and having at its other end a branch for each radiator, a valve for each branch adapted to close it, means tending to hold each valve open, a second pipe connected at one end to a source of air under pressure and having at its other end a branch for each valve to apply pressure thereto to close it, a second valve to open and close the second pipe, thermostatic means remote from the radiators to operate the last-named valve, one of said last-named branches having a restricted section to retard the flow of air through it, a valve connected to the second pipe to relieve the pressure independent of the second valve, and thermostatic means adjacent one of the radiators to operate the last-named valve.

7. In a heating apparatus, a plurality of radiators, a pipe connected at one end to a source of heating fluid and having at its other end a branch for each radiator, a valve for each branch adapted to close it, means tending to hold each valve open, a second pipe connected at one end to a source of air under pressure and having at its other end a branch for each valve to apply pressure thereto to close it, a second valve to open and close the second pipe, thermostatic means remote from the radiators to operate the last-named valve, one of said last-named branches having a restricted section to retard the flow of air through it, a valve connected to the second pipe to relieve the pressure independent of the second valve, and thermostatic means adjacent the radiators to operate the last-named valve.

8. In a heating apparatus, a plurality of radiators, a pipe connected at one end to a source of heating fluid and having at its other end a branch for each radiator, a valve for each branch adapted to close it, means tending to hold each valve open, a second pipe connected at one end to a source of air under pressure and having at its other end a branch for each valve to apply pressure thereto to close it, a second valve to open and close the second pipe, means remote from the radiators to operate the last-named valve, one of said last-named branches having a restricted section to retard the flow of air through it, a valve connected to the second pipe to relieve the pressure independent of the second valve, and thermostatic means adjacent the radiators to operate the last-named valve.

9. In a heating and ventilating unit, one or more radiators, a valve controlling the flow of heating fluid to said radiator or radiators, means tending to hold said valves open, a second pipe connected at one end to a source of air under pressure and having at its other end a branch having one connection to the said valves to apply pressure thereto to close it or to regulate the flow of steam through it to control the room temperature, a second connection from said branch to a restrictive orifice to retard the flow of air through it, a connection to said orifice leading to a second branch, a connection to the second branch leading to thermostatic means of regulating the air pressure beyond the orifice in accordance with the temperature of the air before it enters said radiator, a second connection to said second branch leading to air bellows.

WARREN EWALD.